(12) United States Patent
Yamaguchi

(10) Patent No.: US 10,590,893 B2
(45) Date of Patent: Mar. 17, 2020

(54) INTAKE MANIFOLD

(71) Applicant: TOYOTA BOSHOKU KABUSHIKI KAISHA, Aichi (JP)

(72) Inventor: Takuma Yamaguchi, Aichi (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 0 days.

(21) Appl. No.: 16/223,786

(22) Filed: Dec. 18, 2018

(65) Prior Publication Data
US 2019/0203676 A1 Jul. 4, 2019

(30) Foreign Application Priority Data

Dec. 29, 2017 (JP) .................................. 2017-255151

(51) Int. Cl.
| | | |
|---|---|---|
| *F02M 35/104* | (2006.01) | |
| *F02M 35/10* | (2006.01) | |
| *B29C 65/06* | (2006.01) | |
| *B29C 65/00* | (2006.01) | |
| *B29L 31/00* | (2006.01) | |

(52) U.S. Cl.
CPC ....... *F02M 35/104* (2013.01); *B29C 65/0609* (2013.01); *B29C 66/543* (2013.01); *F02M 35/1036* (2013.01); *F02M 35/10255* (2013.01); *F02M 35/10295* (2013.01); *F02M 35/10321* (2013.01); *B29L 2031/7492* (2013.01)

(58) Field of Classification Search
CPC ............. F02M 35/1036; F02M 35/104; F02M 35/10039; F02M 35/10144; F02M 35/10354; F02M 35/1277; F02M 35/10072
See application file for complete search history.

(56) References Cited

U.S. PATENT DOCUMENTS

| | | | | |
|---|---|---|---|---|
| 5,887,907 A | * | 3/1999 | Kubota | .................... F01N 13/10 |
| | | | | 285/124.1 |
| 2004/0159298 A1 | * | 8/2004 | Ino | ...................... B29C 45/0062 |
| | | | | 123/184.21 |
| 2004/0200450 A1 | * | 10/2004 | Tanikawa | ................ B29C 65/06 |
| | | | | 123/184.42 |

(Continued)

FOREIGN PATENT DOCUMENTS

| | | |
|---|---|---|
| JP | H09-177624 A | 7/1997 |
| JP | 2004-263651 A | 9/2004 |

*Primary Examiner* — Long T Tran
(74) *Attorney, Agent, or Firm* — Greenblum & Bernstein, P.L.C.

(57) ABSTRACT

The present intake manifold consists of segments including an upper member, a lower member, and a middle member that is interposed between these members to demarcate and form intake passages so that the intake passages are arranged in a straight line, and has first welded portions at which the upper member and the middle member are welded together, and second welded portions at which the middle member and the lower member are welded together. The first welded portions are extended outward from the intake passage formed by the upper member and the middle member, and the second welded portions are extended outward from the intake passage formed by the middle member and the lower member. The middle member is provided with ribs holding the first welded portions and the second welded portions in one piece.

8 Claims, 6 Drawing Sheets

(56) References Cited

U.S. PATENT DOCUMENTS

| | | | |
|---|---|---|---|
| 2010/0288247 A1* | 11/2010 | Tanikawa | F02M 35/10039 123/568.11 |
| 2012/0021179 A1* | 1/2012 | Ohta | B29C 65/069 428/156 |
| 2015/0240762 A1* | 8/2015 | Nomura | F02M 35/10118 123/184.21 |

* cited by examiner

INTAKE MANIFOLD

INCORPORATED BY REFERENCE

The present application claims priority under 35 U.S.C. § 119 of Japanese Application No. 2017-255151 filed on Dec. 29, 2017, the disclosure of which is expressly incorporated by reference herein in its entirety.

BACKGROUND OF THE INVENTION

(1) Field of the Invention

The present invention relates to an intake manifold for introducing air into combustion chambers of an engine.

(2) Description of Related Art

An intake manifold having a structure with a plurality of branches for supplying air to a plurality of cylinders of an engine is mounted. In recent years, resin intake manifolds have become mainstream as the oil resistance and heat resistance of resins are improved and molding and processing technologies evolve. A typical intake manifold, for example, of a structure with two branching intake pipes in one piece and two intake passages arranged side by side in a horizontal direction consists of two segments, an upper member 61 and a lower member 62, as shown in a cross-sectional view of two intake passages in FIG. 7. An intake manifold 60 is formed by joining the upper member 61 and the lower member 62 pressed from above and below using an upper jig 64 and a lower jig 65 together at welded portions 63 by means of vibration welding or the like.

As a technology related to this type of intake manifold, for example, JP 9-177624 A discloses one in which a plurality of hollow intake pipes are arranged in a straight line orthogonal to a welding pressure direction. JP 2004-263651 A discloses an intake manifold having a configuration in which a plurality of hollow intake pipes are offset by a half circle with respect to one axis. In these intake manifolds, a plurality of welded portions are arranged in a straight line orthogonal to a welding pressure direction. Thus, when an upper member and a lower member are joined together by vibration welding, an upper jig and a lower jig can be installed in positions in contact with or in proximity to the welded portions. Consequently, the upper member and the lower member can be stably held in fixed positions by the jigs under the pressure of a vibration welding machine, so that good welding conditions can be obtained at each of the welded portions.

Incidentally, intake manifolds, whose shapes, sizes, and the like greatly affect the performance of engines, are formed in optimum shapes and the like according to the characteristics of vehicles and the like and use environments, and are formed in shapes and the like according to various layouts of piping of the intake manifolds. Here, for example, as intake manifolds, if those in which a plurality of intake passages are arranged in a straight line in a welding pressure direction, that is, those in which a plurality of intake passages are aligned in a direction 90 degrees different from that of the intake passages shown in FIG. 7 can be manufactured, the degree of freedom in designing piping of intake manifolds is further increased.

However, there have been no intake manifolds with a plurality of intake passages arranged in a straight line in a welding pressure direction, including the intake manifolds described in the above-mentioned patent documents. It can thus be considered to manufacture an intake manifold with a plurality of intake passages arranged in a straight line in a welding pressure direction. In that case, as shown in FIG. 8B, the intake manifold may consist of segments in a three-layer structure with an upper member 71, a lower member 72, and an additional middle member 73 interposed between these members for demarcating intake passages. Here, the middle member 73 may be formed by a pair of upper and lower half cylinders located between the upper member 71 and the lower member 72 with the lower half cylinder and the upper half cylinder coupled vertically in one piece, and may be substantially X-shaped in a cross sectional shape. To manufacture an intake manifold 70 from these segments, for example, first, as shown in FIG. 8A, the upper member 71 and the middle member 73 are joined together by frictional heat by vibrating the upper member 71 laterally under vertical pressure, and then, as shown in FIG. 8B, the middle member 73 and the lower member 72 are likewise joined together by vibration welding.

However, the intake manifold of that structure has complicated piping routes of the intake passages, which often makes it difficult to insert a support jig for vibration welding laterally into empty spaces 75 between the lower half cylinder and the upper half cylinder at the middle member 73. Consequently, when the upper member 71 and the middle member 73 are welded together, and when the middle member 73 and the lower member 72 are welded together, the empty spaces 75 are present at the middle member 73, and left and right welded portions 74 cannot be directly held between the upper and lower jigs in positions in contact with or in proximity to them, so that the resin members are susceptible to bending and deformation between the upper and lower jigs due to pressure during welding. As a result, the welded portions cannot be held stably in fixed positions, and the segments cannot be securely welded and joined together in a stabilized state.

SUMMARY OF THE INVENTION

It is thus an object of an embodiment of the present invention to provide an intake manifold including resin segments that can be prevented from being bent under pressure during welding to be securely welded and joined together in a state of being stably supported in fixed positions.

One aspect of the present embodiments provides an intake manifold formed of resin with a throttle valve mounting portion to which a throttle body is mounted, a surge tank, intake passages communicating with intake ports of a multi-cylinder engine in a one-to-one relationship, and engine-side mounting portions mounted to an engine side, arranged and connected in sequence downstream in intake air flow directions, the intake manifold including:

segments including an upper member, a lower member, and a middle member that is interposed between the upper member and the lower member to demarcate and form the intake passages so that the intake passages are arranged in a straight line; and first welded portions at which the upper member and the middle member are welded together, and second welded portions at which the middle member and the lower member are welded together, the first welded portions being extended outward from one of the intake passages formed by the upper member and the middle member, the second welded portions being extended outward from the other one of the intake passages formed by the middle member and the lower member, the middle member being provided with at least one rib holding the first welded portions and the second welded portions in one piece.

In a further aspect, the at least one rib may support the first welded portions and the second welded portions in a direction of the straight line.

In a further aspect, a length between the first welded portions and the second welded portions may be smaller than a distance between a first mating plane of the one intake passage formed by the upper member and the middle member, and a second mating plane of the other intake passage formed by the middle member and the lower member.

In a further aspect, the first welded portions may be located closer to the second welded portions than the first mating plane in the direction of the straight line, and the second welded portions may be located closer to the first welded portions than the second mating plane in the direction of the straight line.

In a further aspect, the at least one rib may comprise a plurality of ribs formed in a plate shape and arranged side by side along an intake air flow direction of the middle member.

In a further aspect, the upper member and the lower member may be each formed in a half cylinder shape, and the middle member may be formed in a substantially X shape in a cross-sectional shape thereof.

According to the intake manifold of the present embodiment, which consists of the segments including the upper member, the lower member, and the middle member interposed between these members to demarcate and form the intake passages so that the intake passages are arranged in a straight line, the intake passages can be arranged in a straight line in a segment welding pressure direction, which results in an increased degree of freedom in the layout of the intake manifold according to the mounting requirements of the engine. Further, since the middle member is provided with the at least one rib holding the first welded portions and the second welded portions in one piece, when the upper member and the middle member are welded together, and when the middle member and the lower member are welded together, the at least one rib serves as a support against pressure during welding, thus preventing the welded portions of the members from being bent under pressure, so that the members can be stably welded together. As a result, the members can be securely joined together.

When the at least one rib supports the first welded portions and the second welded portions in the direction of the straight line, the welded portions of the members are prevented from being bent under pressure, so that the members can be welded together more stably.

When the length between the first welded portions and the second welded portions is smaller than the distance between the first mating plane of the intake passage formed by the upper member and the middle member and the second mating plane of the intake passage formed by the middle member and the lower member, the length between the first welded portions and the second welded portions is reduced, and the length of the at least one rib between the welded portions becomes shorter correspondingly, and the bending of the at least one rib itself becomes smaller, so that the welded portions of the members are further prevented from being bent under pressure, so that the members can be welded together more stably.

Further, when the first welded portions are located closer to the second welded portions than the first mating plane in the direction of the straight line, and the second welded portions are located closer to the first welded portions than the second mating plane in the direction of the straight line, the length of the at least one rib becomes shorter, and thus the bending of the at least one rib itself becomes smaller.

When the at least one rib includes a plurality of ribs formed in a plate shape and arranged side by side along the intake air flow direction of the middle member, the capacity of bearing the members by the ribs against pressure during welding can be further increased.

Further, when the upper member and the lower member are each formed in a half cylinder shape, and the middle member is formed in a substantially X shape in a cross-sectional shape thereof, the segments of the simple structures can form a plurality of intake passages arranged in a straight line in the segment welding pressure direction.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF PREFERRED EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

Hereinafter, an intake manifold in an embodiment of the present invention will be described with reference to the drawings. The present embodiment exemplifies an intake manifold for introducing air into each intake port of a multi-cylinder horizontally opposed engine of a vehicle.

Figure 1:
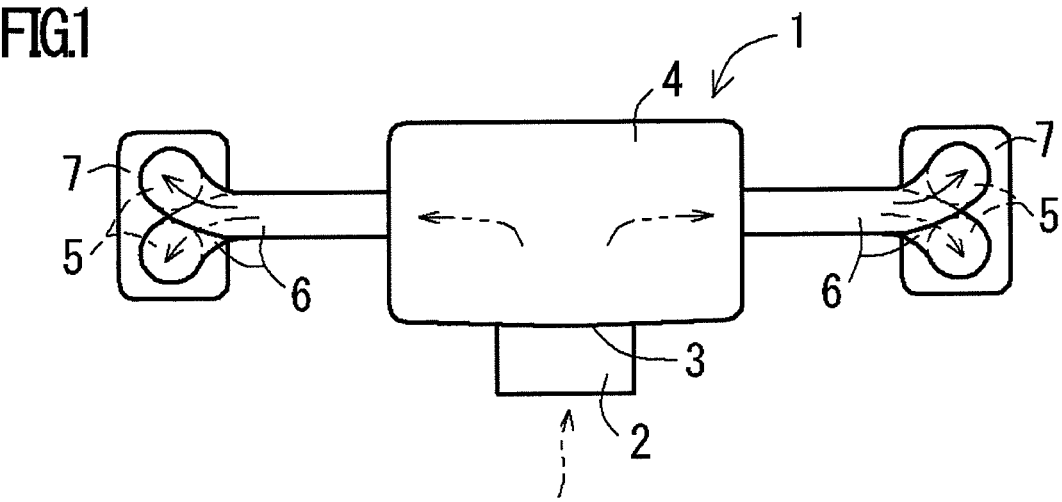
FIG. 1 is a plan view of an intake manifold according to an embodiment of the present invention.

In FIG. 1, an intake manifold 1 of the present embodiment includes a throttle valve mounting portion 3 to which a throttle body 2 is mounted, a surge tank 4, a plurality of intake passages 6 communicating with each intake port 5 of a multi-cylinder engine, and engine-side mounting portions 7 mounted to the engine side, which are arranged and connected in sequence downstream in intake air flow directions. In the present embodiment shown, the engine has four cylinders, and the intake passages 6 formed by intake pipes each branch in two to the left and right of the surge tank 4 and communicate with the intake ports 5 of the cylinders. Here, the surge tank 4 is a large space such as a tank, and is a space for equalizing the supply amount of air to the plurality of cylinders and supplying stable air to the engine, and stabilizes output characteristics at the time of rotational fluctuations. Arrows in FIG. 1 indicate flows of air.

Figure 2:
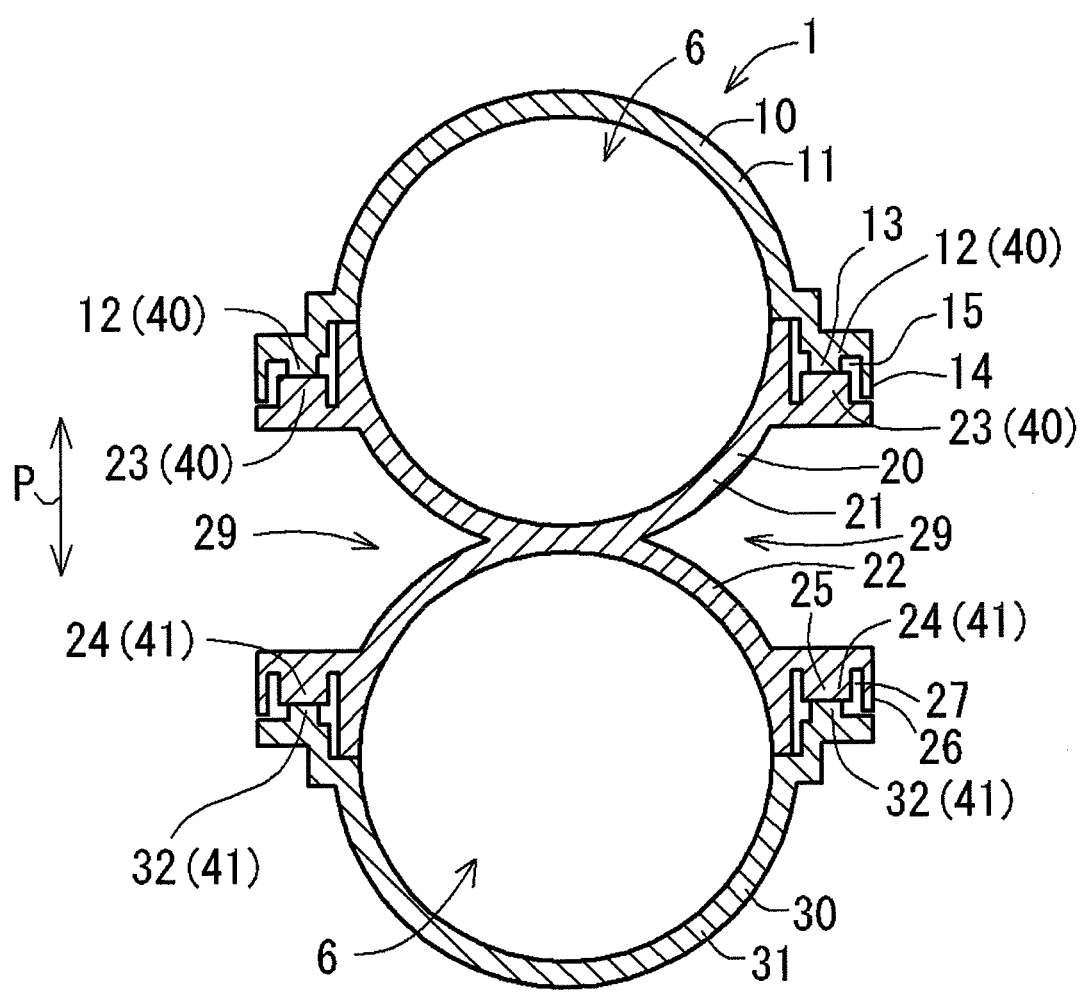
FIG. 2 is a cross-sectional view taken along cutting line A-A in FIG. 4.

As shown in the cross-sectional views of FIGS. 2 and 3, the intake passages 6 each branching in two to the left and right of the surge tank are arranged side by side in a linear direction P (that is, a segment welding pressure direction P described later). The intake manifold 1 is formed of a synthetic resin, and consists of segments due to its complicated shape. Specifically, the segments include an upper member 10, a lower member 30, and a middle member 20 interposed between these members to demarcate and form the intake passages 6 so that the intake passages 6 are arranged in a straight line. Since the intake manifold 1 is comparatively large, the segments are joined in one piece by vibration welding. In vibration welding, with two resin molded pieces under pressure, one molded piece is fixed and the other molded piece is laterally vibrated, generating frictional heat between contact surfaces of the molded pieces, thereby melting and welding the molded pieces together.

The segments of the intake manifold 1 are divided at division planes suitable for vibration welding. Specifically, the upper member 10 is in the top layer in FIG. 2 and is formed by an upper half cylinder 11, and the lower member 30 is in the bottom layer and is formed by a lower half cylinder 31. The middle member 20 is located between the upper member 10 and the lower member 30 and is formed by a pair of connected bodies in which an upper half cylinder 21 and a lower half cylinder 22 are connected in one piece in the linear direction P, and is substantially X-shaped in a cross-sectional shape.

The segments are joined in one piece by vibration welding, thereby forming the intake manifold 1. That is, the intake manifold 1 has first welded portions 40 at which the upper member 10 and the middle member 20 are welded together, and second welded portions 41 at which the middle member 20 and the lower member 30 are welded together. The first welded portions 40 are extended outward from the upper intake passage 6 formed by the upper member 10 and the middle member 20. Specifically, the first welded portions 40 are formed by upper member-side welded portions 12 that are extended outward and protruded downward at lower edge portions of both the left and right sides of the upper member 10, and middle member upper welded portions 23 that are extended outward and protruded upward at upper edge portions of both the left and right sides of the middle member 20. The second welded portions 41 are extended outward from the lower intake passage 6 formed by the middle member 20 and the lower member 30. Specifically, the second welded portions 41 are formed by middle member lower welded portions 24 that are extended outward and protruded downward at lower edge portions of both the left and right sides of the middle member 20 and lower member-side welded portions 32 that are extended outward and protruded upward at upper edge portions of both the left and right sides of the lower member 30.

Figure 3:
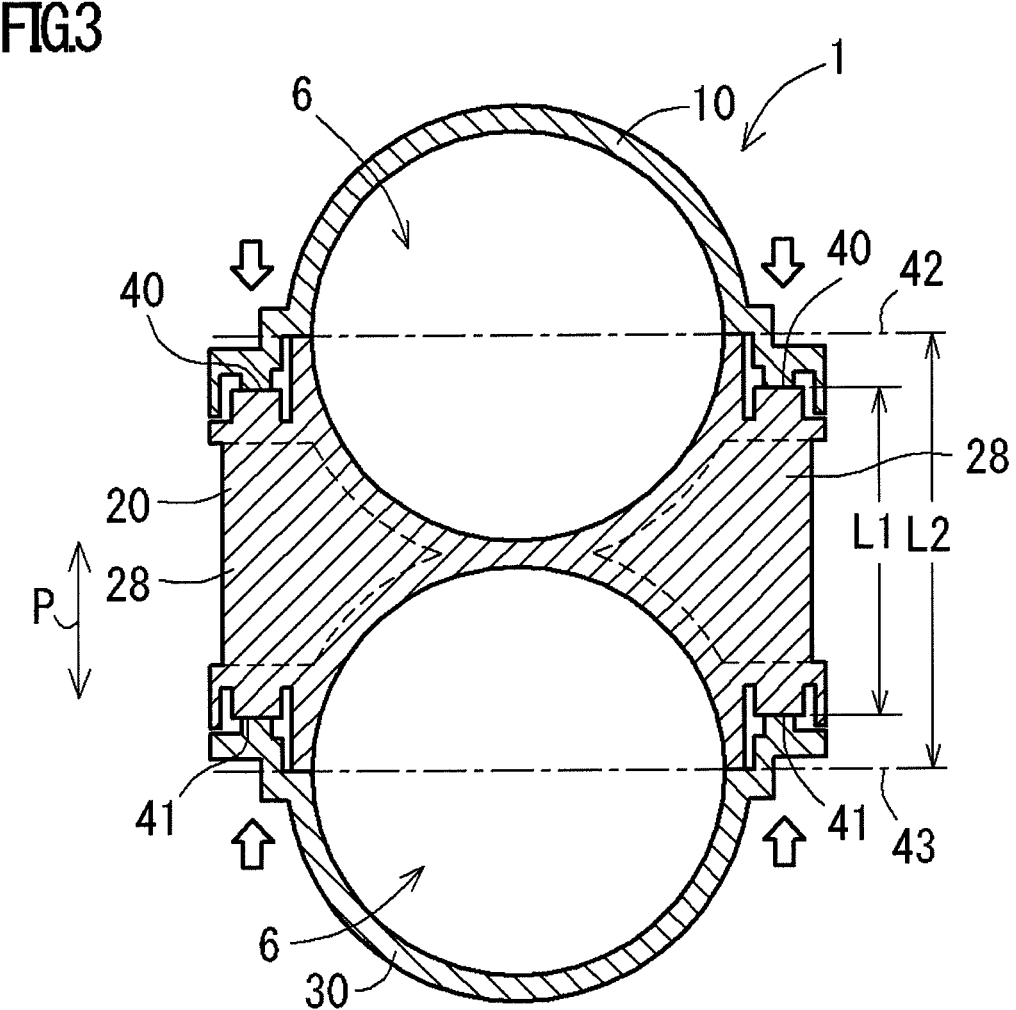
FIG. 3 is a cross-sectional view taken along cutting line B-B in FIG. 4.

As shown in FIG. 3, the first welded portions 40 are located closer to the second welded portions 41 than a first mating plane 42 of the upper intake passage 6 in the linear direction P (that is, in positions displaced a predetermined distance downward from the first mating plane 42). The first mating plane 42 passes on the center line of the upper intake passage 6. The second welded portions 41 are located closer to the first welded portions 40 than a second mating plane 43 of the lower intake passage 6 in the linear direction P (that is, in positions displaced a predetermined distance upward from the second mating plane 43). The first mating plane 42 passes on the center line of the upper intake passage 6. At the welded portions, the upper member-side welded portions 12 and the middle member lower welded portions 24 have welded protrusions 13 and 25 protruding downward, respectively. Mating faces of the welded portions are formed in a flat surface. At the welded portions, the welded protrusions 13 and 25 are melted by heat generated by vibration welding under pressure in the linear direction P, thereby joining the upper and lower resin. Further, on the outer surface sides of the first welded portions 40 and the second welded portions 41, vertical wall pieces 14 and 26 protruding vertically downward are provided along the longitudinal direction of the intake passages 6, respectively, forming gutters 15 and 27 inside, respectively, for preventing flash melted during vibration welding from leaking outward, and collecting the flash.

Figure 4:
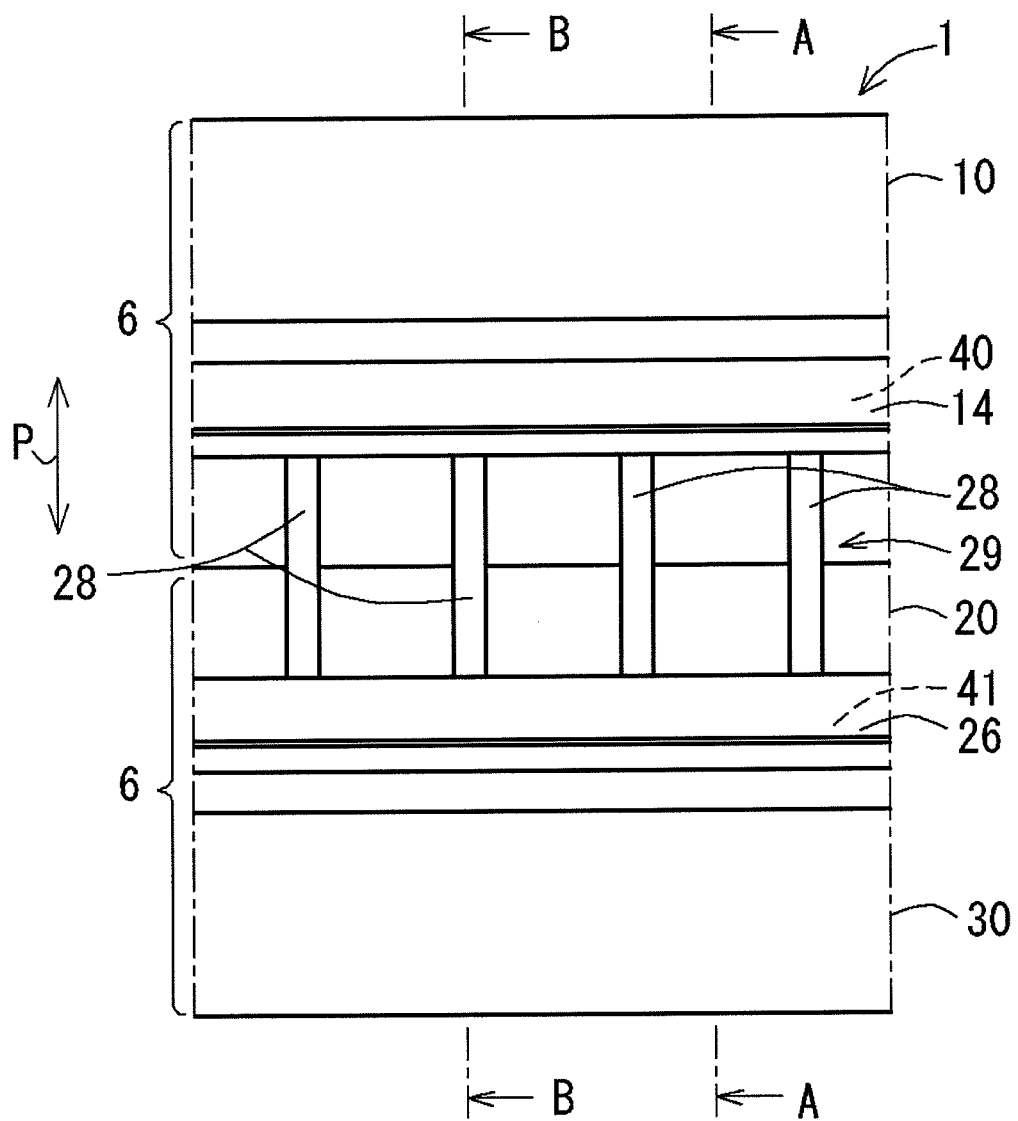
FIG. 4 is a side view of intake passages in FIG. 1.

As shown in FIGS. 3 and 4, the middle member 20 has, in empty spaces 29 between the first welded portions 40 and the second welded portions 41, a plurality of ribs 28 erected in the linear direction P with both upper and lower edges joined to them to hold the first welded portions 40 and the second welded portions 41 in one piece. That is, the ribs 28 support the first welded portions 40 and the second welded portions 41 in the linear direction P. Here, FIG. 3 is a cross-sectional view taken along cutting line B-B in FIG. 4 when the intake pipes of the intake passages 6 are viewed from the side, and shows a cross section of a portion where the ribs 28 are provided. Note that FIG. 2 is a cross-sectional view taken along cutting line A-A in FIG. 4, showing a cross section of a portion where no ribs 28 are provided.

The ribs 28 are formed in a plate shape with a constant thickness, provided to extend out to both sides of the middle member 20 in one piece, and erected plurally at predetermined intervals along the intake air flow direction of the middle member 20. As described above, the first welded portions 40 are provided in positions displaced downward from the first mating plane 42 of the upper intake passage 6, and the second welded portions 41 are provided in positions displaced upward from the second mating plane 43 of the lower intake passage 6. Consequently, as shown in FIG. 3, the length L1 between the first welded portions 40 and the second welded portions 41 is smaller than the distance L2 between the first mating plane 42 and the second mating plane 43. Thus, the height of the ribs 28 is reduced correspondingly. Note that the length L1 is strictly the length between the mating faces of the upper member-side welded portions 12 and the middle member upper welded portions 23 constituting the first welded portions 40 and the mating faces of the middle member lower welded portions 24 and the lower member-side welded portions 32 constituting the second welded portions 41.

The members are held in fixed positions in a vibration welding machine with an upper jig abutting on the upper surface of the upper member 10, and a lower jig abutting on the lower surface of the middle member 20 or the lower member 30. At the time of welding, the members are pressed in the linear direction P by raising a table 54 provided below the lower jig by a hydraulic device not shown.

Figure 5:
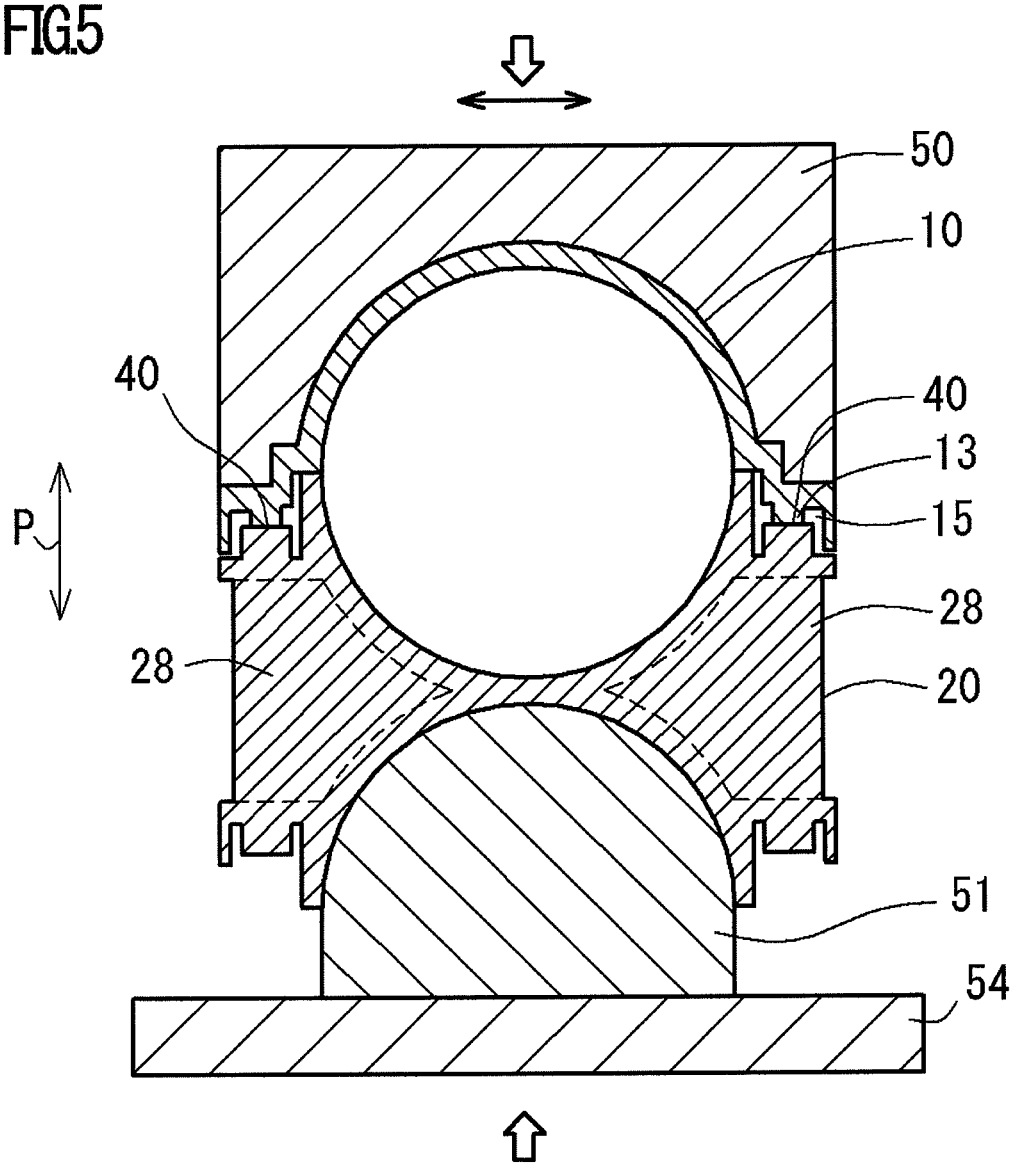
FIG. 5 is a cross-sectional view showing a state in which an upper member and a middle member in FIG. 3 are joined together by vibration welding.

To form the intake manifold 1 of the present embodiment thus constituted by the vibration welding of the segments, first, as shown in FIG. 5, the upper member 10 and the middle member 20 are joined together by welding. To do so, the middle member 20 is placed on a lower jig 51 of the vibration welding machine, and the upper member 10 is placed on the middle member 20 from above, or the middle member 20 is placed on the lower jig 51 with the upper member 10 placed on the middle member 20 vertically. Next, the upper jig 50 is placed on the upper surface of the upper member 10, and the upper member 10 and the middle member 20 are sandwiched and held in one piece between the upper jig 50 and the lower jig 51. In this state, the middle member 20 on the lower side is held and fixed in a fixed position by the lower jig 51, and the upper member 10 on the upper side is held by the upper jig 50 laterally reciprocably with predetermined amplitude. Next, the table 54 is raised to press the both members into one piece.

Then, under pressure, lateral vibrations are generated in the upper jig 50 by using repulsive force between an electromagnetic coil and a spring in the vibration welding machine not shown, to repeatedly rub the mating faces of the welded protrusions 13 of the upper member-side welded portions 12 and the middle member upper welded portions 23 of the first welded portions 40. Here, the welded protrusions 13 are provided to concentrate vibration energy on mating portions. The resin of the mating faces is melted by frictional heat, and part of molten margins are discharged as flash by the applied pressure and collect in the gutters 15. Then, the upper member 10 and the middle member 20 are cooled to be joined together.

Figure 6:
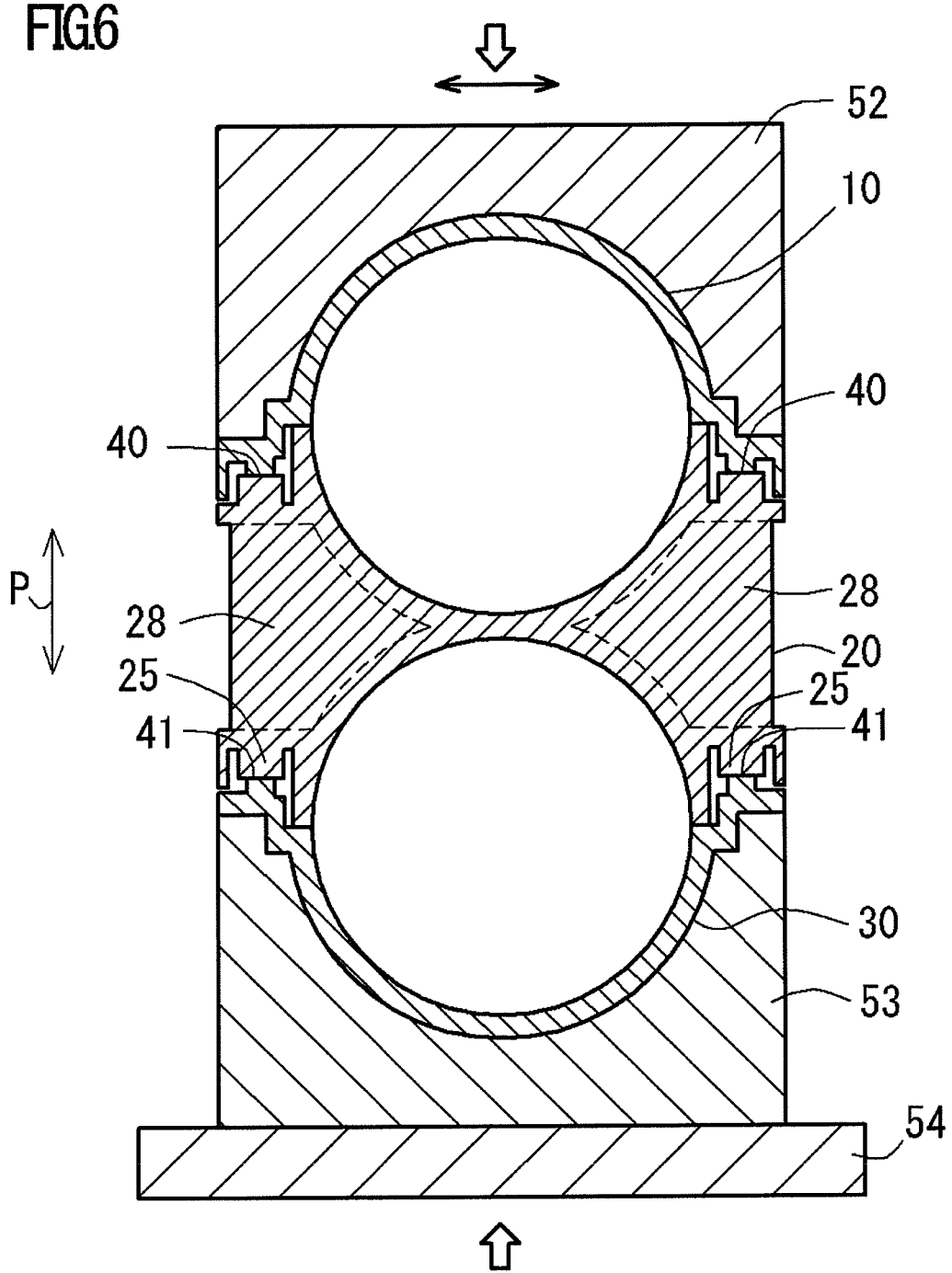
FIG. 6 is a cross-sectional view showing a state in which the middle member and a lower member in FIG. 3 are joined together by vibration welding.
Figure 7:
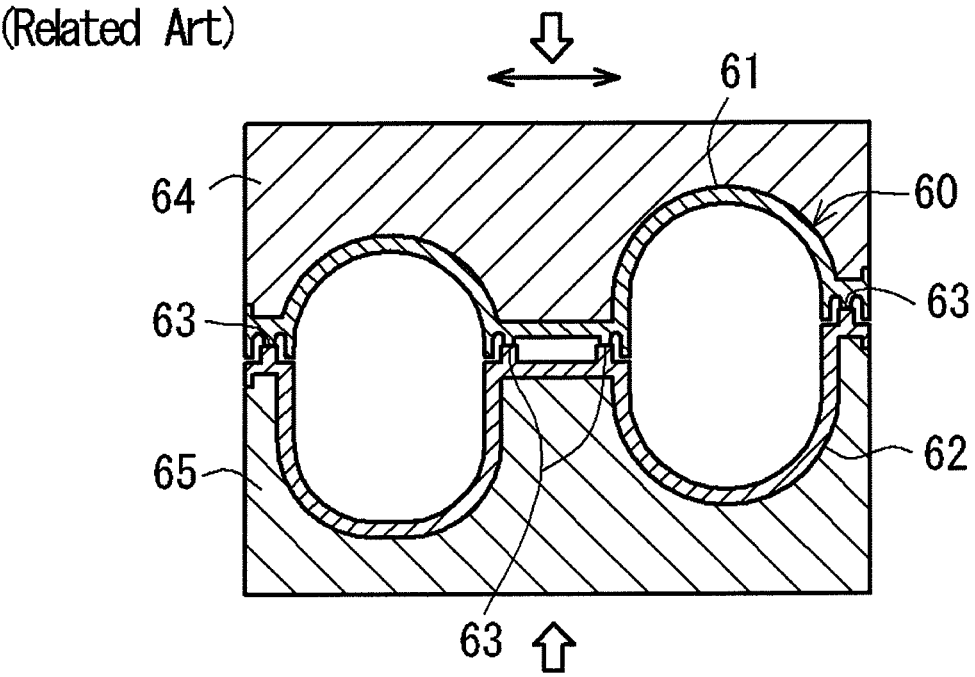
FIG. 7 is a cross-sectional view showing a state in which an upper member and a lower member of a conventional intake manifold are joined together by vibration welding.
Figure 8A:
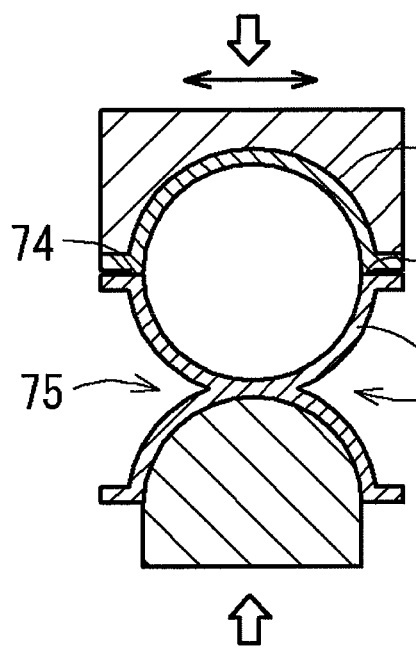
FIGS. 8A and 8B are cross-sectional views for explaining a problem when segments of an intake manifold in which a plurality of intake passages are arranged in a straight line in a segment welding pressure direction are joined together by vibration welding.
Figure 8B:
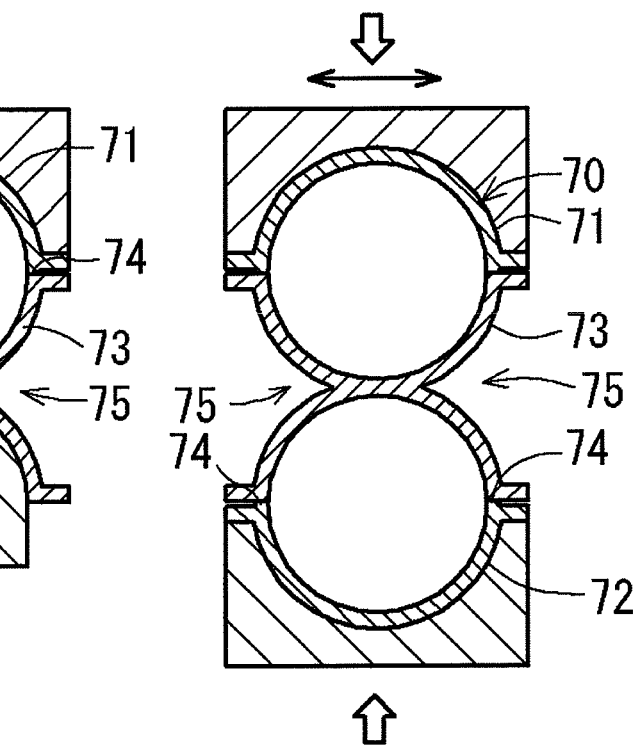

When the upper member 10 and the middle member 20 are thus joined together, next, in the same manner, as shown in FIG. 6, the lower member 30 is placed on the lower jig 53, and the upper member 10 and the middle member 20 joined together are placed on the lower member 30, or the lower member 30 is placed on the lower jig 53 with the upper member 10 and the middle member 20 placed on the lower member 30 vertically. Next, the upper jig 52 is placed on the upper side of the upper member 10, the table 54 is raised, and these members are sandwiched and pressed in one piece. In this state, lateral vibrations are generated in the upper jig 52, the mating faces of the welded protrusions 25 of the middle member lower welded portions 24 and the lower member-side welded portions 32 of the second welded portions 41 are rubbed repeatedly, the resin of the mating faces melts due to frictional heat, and the middle member 20 and the lower member 30 are joined together. In this way, the intake manifold 1 is formed.

Next, the effects of the intake manifold 1 in the present embodiment will be described.

According to the intake manifold 1 of the present invention, which consists of the segments including the upper member 10, the lower member 30, and the middle member 20 interposed between these members to demarcate and form the intake passages 6 so that the a plurality of intake passages 6 are arranged in a straight line, the intake passages 6 can be arranged in a straight line in the segment welding pressure direction P, which results in an increased degree of freedom in the layout of the intake manifold 1 according to the mounting requirements of the engine. Further, since the middle member 20 is provided with the ribs 28 holding the first welded portions 40 and the second welded portions 41 in one piece, when the upper member 10 and the middle member 20 are welded together, and when the middle member 20 and the lower member 30 are welded together, the ribs 28 serve as supports against pressure from above and below during welding, thus preventing the welded portions of the members from being bent under pressure. As a result, the members can be stably welded together, and the members can be securely joined together. In particular, the ribs 28 support the first welded portions 40 and the second welded portions 41 in the linear direction P, and thus prevent the welded portions of the members from being bent under pressure so that the members can be welded together more stably.

To add explanation in this regard, assume that the ribs 28 holding the first welded portions 40 and the second welded portions 41 in one piece are not provided. When it is difficult to support the members with jigs in positions in contact with or in positions in proximity to the welded portions in welding the upper member 10 and the middle member 20 together, and in welding the middle member 20 and the lower member 30 together, the resin members are bent under applied pressure during welding, sinking downward, and cannot be stably supported and held in fixed positions. Therefore, in the present invention, the ribs 28 are provided at the middle member 20 as described above.

The length L1 between the first welded portions 40 and the second welded portions 41 at the ribs 28 is smaller than the distance L2 between the first mating plane 42 of the intake passage 6 formed by the upper member 10 and the middle member 20 and the second mating plane 43 of the intake passage 6 formed by the middle member 20 and the lower member 30, so that the length between the first welded portions 40 and the second welded portions 41 at the ribs 28 is also reduced, and the bending of the ribs 28 themselves becomes small correspondingly. Consequently, the welded portions of the members can be further prevented from being bent under pressure, and can be welded together more stably. In particular, the first welded portions 40 are located closer to the second welded portions 41 than the first mating plane 42 in the linear direction P, and the second welded portions 41 are located closer to the first welded portions 40 than the second mating plane 43 in the linear direction, so that the length of the ribs 28 becomes shorter, and thus the bending of the ribs 28 themselves becomes smaller.

In the above embodiment, the upper member 10 and the middle member 20 are joined together by vibration welding, and then the joined bodies and the lower member 30 are joined together by vibration welding, but the present invention is not limited to this. After joining the middle member 20 and the lower member 30 together by vibration welding, the joined bodies and the upper member 10 may be joined together by vibration welding. The order does not matter.

Although the first welded portions 40 in the above embodiment are set in positions displaced a predetermined distance downward from the first mating plane 42 of the upper intake passage 6, and the second welded portions 41 are set in positions displaced a predetermined distance upward from the second mating plane 43 of the lower intake passage 6, the first welded portions 40 and/or the second welded portions 41 may be provided in the mating planes or plane of the intake passages or passage 6. Alternatively, on the contrary, the first welded portions 40 may be set above the first mating plane 42 of the upper intake passage 6, and the second welded portions 41 may be set below the second mating plane 43 of the lower intake passage 6.

Further, the ribs 28, which are formed in a plate shape with a constant thickness and are provided plurally at regular intervals along the intake air flow direction, are not limited to this shape. The thickness may vary at different portions. Furthermore, the plurality of ribs 28 may not necessarily be provided at regular intervals.

In addition, to increase the strength and rigidity of the ribs 28 themselves, for example, a small vertical protruding strip may be integrally provided on an outer flat surface of each plate-shaped rib 28, or reinforcing ribs may be formed at portions joined to the upper and lower members.

The intake manifold 1 of the above embodiment consists of the segments including the one upper member 10, the one middle member 20, and the one lower member 30, and the two intake passages 6 are arranged side by side in a straight line. The present invention is not limited to this when implemented, and may be an intake manifold in which three or more intake passages 6 are formed in a straight line. In this case, the middle member 20 interposed between the upper member 10 and the lower member 30 includes a plurality of connected bodies substantially X-shaped in cross section each having an upper half cylinder 21 and a lower half cylinder 22 joined in one piece.

For example, in an intake manifold including three intake passages 6 in a straight line, the middle member 20 has two connected bodies substantially X-shaped in cross section in the linear direction P. In this case, in empty spaces 29 between the upper half cylinder 21 and the lower half cylinder 22 constituting each connected body of the middle member 20, ribs 28 similar to those in the above embodiment are erected, being extended out to both sides.

In the above embodiment, welding of the upper member 10 and the middle member 20 and welding of the middle member 20 and the lower member 30 are performed by a vibration welding method. However, when the present invention is implemented, welding by another means such as ultrasonic welding or laser welding is possible, which makes it possible to manufacture an intake manifold with intake passages 6 placed on each other in the linear direction P and joined together.

Further, in the above embodiment, when the segments are welded together, an auxiliary jig for pressing and holding the segments may not be installed between the first welded portions 40 and the second welded portions 41 at the middle member 20, or the auxiliary jig may be installed.

Furthermore, although the above embodiment exemplifies the intake manifold 1 used for a multi-cylinder horizontally opposed engine, the present invention is not limited to this, and for example, may be an intake manifold used for a multi-cylinder in-line engine, a V-engine, or the like.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above-described embodiments, and various variations and modifications may be possible without departing from the scope of the present invention.

What is claimed is:

1. An intake manifold formed of resin with a throttle valve mounting portion to which a throttle body is mounted, a surge tank, intake passages communicating with intake ports of a multi-cylinder engine in a one-to-one relationship, and engine-side mounting portions mounted to an engine side, arranged and connected in sequence downstream in intake air flow directions, the intake manifold comprising:
    segments including an upper member, a lower member, and a middle member that is interposed between the upper member and the lower member to demarcate and form the intake passages so that the intake passages are arranged in a straight line; and
    first welded portions at which the upper member and the middle member are welded together, and second welded portions at which the middle member and the lower member are welded together,
    the first welded portions being extended outward from one of the intake passages formed by the upper member and the middle member,
    the second welded portions being extended outward from the other one of the intake passages formed by the middle member and the lower member,
    the middle member being provided with at least one rib holding the first welded portions and the second welded portions in one piece.

2. The intake manifold according to claim 1, wherein the at least one rib supports the first welded portions and the second welded portions in a direction of the straight line.

3. The intake manifold according to claim 2, wherein a length between the first welded portions and the second welded portions is smaller than a distance between a first mating plane of the one intake passage formed by the upper member and the middle member, and a second mating plane of the other intake passage formed by the middle member and the lower member.

4. The intake manifold according to claim 3,
    wherein the first welded portions are located closer to the second welded portions than the first mating plane in the direction of the straight line, and
    the second welded portions are located closer to the first welded portions than the second mating plane in the direction of the straight line.

5. The intake manifold according to claim 1, wherein a length between the first welded portions and the second welded portions is smaller than a distance between a first mating plane of the one intake passage formed by the upper member and the middle member, and a second mating plane of the other intake passage formed by the middle member and the lower member.

6. The intake manifold according to claim 5,
    wherein the first welded portions are located closer to the second welded portions than the first mating plane in the direction of the straight line, and
    the second welded portions are located closer to the first welded portions than the second mating plane in the direction of the straight line.

7. The intake manifold according to claim 1, wherein the at least one rib comprises a plurality of ribs formed in a plate shape and arranged side by side along an intake air flow direction of the middle member.

8. The intake manifold according to claim 1,
wherein the upper member and the lower member are each formed in a half cylinder shape, and
the middle member is formed in a substantially X shape in a cross-sectional shape thereof.

* * * * *